United States Patent [19]

Parker et al.

[11] Patent Number: 4,851,931
[45] Date of Patent: Jul. 25, 1989

[54] METHOD AND APPARATUS FOR PRODUCING AN AUDIO MAGNETIC TAPE RECORDING AT HIGH SPEED FROM A PRESELECTED MUSIC LIBRARY

[75] Inventors: Lorne A. Parker, Middleton; Steven R. Hanrahan, Sun Prairie, both of Wis.; Julian Kleiner, Chomedey, Canada

[73] Assignee: 1K Music International Ltd., Montreal, Canada

[21] Appl. No.: 314,269

[22] Filed: Feb. 24, 1989

Related U.S. Application Data

[63] Continuation of Ser. No. 17,339, Feb. 20, 1987, abandoned.

[51] Int. Cl.⁴ .............................................. G11B 5/86
[52] U.S. Cl. ...................................................... 360/15
[58] Field of Search ......................................... 360/15

[56] References Cited

U.S. PATENT DOCUMENTS

| | | |
|---|---|---|
| 3,083,269 | 8/1963 | Gaubert . |
| 3,243,780 | 7/1966 | Bendick . |
| 3,518,645 | 4/1970 | Leinberger . |
| 3,620,476 | 1/1971 | Cervantes . |
| 3,789,137 | 1/1974 | Newell ................................. 360/8 |
| 3,825,949 | 6/1971 | Pyles . |
| 3,854,660 | 12/1974 | Henegar . |
| 3,990,710 | 4/1976 | Hughes . |
| 4,138,694 | 2/1979 | Doi et al. ............................. 360/8 |
| 4,141,045 | 3/1979 | Sheehan . |
| 4,227,220 | 11/1980 | Brown . |
| 4,325,135 | 9/1982 | Dil . |
| 4,355,338 | 9/1982 | Yamamoto . |
| 4,463,389 | 7/1984 | Golding ............................... 360/8 |
| 4,528,643 | 4/1985 | Freeny . |
| 4,597,058 | 6/1986 | Izumi . |
| 4,703,465 | 10/1987 | Parker ................................. 360/15 |

FOREIGN PATENT DOCUMENTS

| | | |
|---|---|---|
| 2047386 | 2/1973 | Fed. Rep. of Germany . |
| 2255371 | 6/1973 | Fed. Rep. of Germany . |
| 2400864 | 5/1974 | Fed. Rep. of Germany . |
| 2625695 | 9/1985 | Fed. Rep. of Germany . |
| 56-83846 | 1/1981 | Japan . |
| 2013865 | 4/1983 | United Kingdom . |

OTHER PUBLICATIONS

IBM Technical Bulletin, vol. 6, No. 9, Feb. 1964.
Research Disclosure, Jun. 1984, No. 242.
IBM Technical Disclosure, vol. 25, No. 10, Mar. 1983.
IBM Technical Disclosure, vol. 8, No. 3, Aug. 1965.

Primary Examiner—Vincent P. Canney
Attorney, Agent, or Firm—Thomas I. Rozsa

[57] ABSTRACT

The present invention relates to a novel method and apparatus for taking an analog audio signal, converting the signal into a digital audio signal, and thereafter converting the digital audio signal into a standard bandwidth video signal and thereby substantially compressing it. In this format, it can be placed onto a master video tape from which it can be transferred to a video disk. The present invention further comprises a method and apparatus from which a selected number of recordings on the video disk can be retrieved by playing the video disc in still frame mode to create an analog video signal, converting the analog video signal into a string of digital values, converting the digital audio stream into an analog audio signal and thereafter recording the audio signal onto an audio tape at high speed. This method and apparatus is used as the central technology in a consumer electronic music center wherein a consumer can randomly select a given number of song selected from a music library and thereafter create his or her own customized audio tape in a matter of minutes.

19 Claims, 2 Drawing Sheets

METHOD AND APPARATUS FOR PRODUCING AN AUDIO MAGNETIC TAPE RECORDING AT HIGH SPEED FROM A PRESELECTED MUSIC LIBRARY

This is a continuation of co-pending application Ser. No. 07/017,339 filed on Feb. 20, 1987 and now abandoned.

BACKGROUND OF THE INVENTION

1. FIELD OF THE INVENTION

The present invention relates to an electronic music center for producing custom audio magnetic tapes. In particular, the present invention is directed to an automated electronic music center that allows a user to produce a custom audio tape at high speed consisting of selections he chooses from a prerecorded selection library.

In general, the present invention relates to a machine that allows a user to select a number of randomly chosen audio selections from a music library containing a multiplicity of selections and to duplicate these selections at high speed on blank magnetic recording tape in the order chosen by the user.

2. DESCRIPTION OF THE PRIOR ART

The audio magnetic tape recording industry is a mature and well-developed industry that spawned a great number of technological innovations. Apparatus with remarkable capabilities have been developed in the art. For example, a combination audio and video player is now available commercially from Pioneer Corporation. Cassette duplicating machines are also well known in the prior art.

In addition, many different techniques and apparatus for recording audio sound on magnetic tape are well known in the prior art.

These and other innovations have made a plethora of audio entertainment readily available to individual users, in a variety of formats, which include, for example, phonograph records, reel-to-reel magnetic tape recordings, 8-track tape cartridges, and cassette tapes. Most recently, audio compact discs have added yet another improvement to the array of audio storage media available to the consumer.

The Inventors are aware of the following prior art patents:

1. U.S. Pat. No. 3,990,710 issued to Hughes in 1976 for "Coin-Operated Recording Machine".
2. U.S. Pat. No. 4,141,045 issued to Sheehan in 1979 for "Random Selection Control System For Recording Tape Cartridges".
3. U.S. Pat. No. 4,227,220 issued to Brown et al. in 1980 for "Tape Recording System".
4. U.S. Pat. No. 4,325,135 issued to Dil et al. in 1982 for "Optical Record Carrier And Apparatus For Reading It."
5. U.S. Pat. No. 4,355,338 issued to Yamamoto et al. in 1982 for "Duplicator".
6. U.S. Pat. No. 4,528,643 issued to Freeny, Jr. in 1985 for "System For Reproducing Information In Material Objects At A Point Of Sale Location".
7. U.S. Pat. No. 4,597,058 issued to Izumi et al. in 1986 for "Cartridge Programming System".
8. German Offenlegungsschrift 26 25 695 issued to Schubert for "Magnetic Tape Automatic Copier".
9. Japanese Pat. 56-83846 (A) issued to Tanaka for "Duplicator Device And Its Method".
10. United Kingdom Patent Application 2 013 865 A applied for by Massari for "System for the Production of Tape Cassettes, Cartridges or the Like".
11. U.S. Pat. No. 3,083,269 issued to Gaubert in 1963 for "Programmed Tape Apparatus".
12. U.S. Pat. No. 3,243,780 issued to Bendick et al. in 1966 for "Random Access Storage And Delivery Device".
13. U.S. Pat. No. 3,518,645 issued to Leinberger et al. in 1970 for "Random Access Data Storage".
14. U.S. Pat. No. 3,620,476 issued to Cervantes in 1971 for "Cassette Duplicator".
15. U.S. Pat. No. 3,825,949 issued to Pyles in 1971 for "Cartridge Changer With Cartridge Sensing Means".
16. U.S. Pat. No. 3,854,660 issued to Henegar in 1974 for "Control System For Multiple Tape Readers In An N-C System".
17. German Auslegeschrift 2,047,386 issued 1973 for "Tape Recorder".
18. German Offenlegungsschrift 2,400,864 issued in 1974 for "Fully Automatic Magnetic Tape Cassette Reproducer".
19. German Offenlegungsschrift 2,255,371 issued in 1973 for "Automatic Articles Storage And Retrieval".
20. IBM Technical Disclosure Bulletin (Vol. 6, No. 9, February, 1964).
21. "Cartridge Library System" (Research Disclosure June 1984, No. 242).
22. IBM Technical Disclosure Bulletin (Vol. 25, No. 10, March, 1983).
23. IBM Technical Disclosure Bulletin (Vol. 8, No. 3, August, 1965).

The above prior art references are discussed more extensively in the Information Disclosure Statement filed concurrently with this application.

The present inventors are also the inventors of presently Co-Pending Patent Application Serial No. 06/804,803 filed Dec. 04, 1985 and presently entitled "1K Entertainment Center".

Notwithstanding these technologies, there is a certain rigidness in availability of selections to an individual consumer. The consumer must purchase a pre-recorded album which naturally includes pre-selected tracks chosen by the album producer. Often, a consumer would have chosen different tracks, if he had been able to. Current recording technology does not readily allow a consumer to choose exactly the selections he would like to store on a record or tape. In addition, the particular novel method by which the huge selection of prerecorded music is conveniently stored in a compressed form for use with the present invention is not disclosed or made obvious by the known prior art.

Therefore, a significant need exists for an apparatus that will allow a consumer to select the specific songs or musical pieces that he wants to have on a particular tape, and will allow him to choose the order of those selections.

SUMMARY OF THE PRESENT INVENTION

The present invention relates to a consumer oriented electronic music center wherein a purchaser may produce his own audio cassette tape at high speed from selections found in a music library housed within the present invention. The music library is located on a video laser disc. In general, the present invention relates to machines which are capable of selecting a multiplicity of randomly-chosen audio selections from the music library, and duplicating them onto blank recording tape at high speed in the order selected.

In a preferred embodiment, the present invention is a free-standing kiosk having a service display available to a consumer. In its interaction with the consumer, the present invention performs the following functions:

(1) It presents and audio and visual display of recordings available in the library that the consumer can choose from;

(2) It allows the consumer to select the songs or other musical pieces in accordance with his personal tastes, from the music library;

(3) It confirms selections made by the consumer on the video display terminal, so that any errors can be corrected before the tape is recorded;

(4) It records the selections on a conventional audio cassette a tape of appropriate length;

(5) It prints a cassette label for the customer, setting forth the specific musical pieces selected; and (6) It issues the completed custom audio tape cassette to the consumer.

Tuning through the FM or AM dial usually brings the same thought to the minds of music enthusiasts. Wouldn't it be convenient and inexpensive if, instead of having to purchase ten albums for the ten appealing hits on the radio, one could purchase a tape of these favorites? One can, of course, given a tape deck and plenty of radio listening time, or access to entire albums. The present invention permits the consumer to customer create, in seconds, a high-quality "hit" cassette tape of his favorite selections from a repertoire of over 1,000.

Some record companies regularly offer "Hit" albums featuring hits from an era, a season, a particular style or artist, but these take months, even years to appear on the market. Even then, consumer choice is restricted by decisions of music producers. The present invention leaps over these incoveniences.

The present invention relates to a novel method and apparatus for taking an analog audio signal, converting the signal into a digital audio signal, and thereafter converting the digital audio signal into a standard bandwidth video signal and thereby substantially compressing it. In this format, it can be placed onto a master video tape from which it can be transferred to a video laser disk. The present invention further comprises a method and apparatus from which a selected number of recordings on the video laser disk can be retrieved by playing the video disc in still frame mode to create an analog video signal, converting the analog video signal into a string of digital values, converting the digital audio stream into an analog audio signal and thereafter recording the audio signal onto an audio tape. This method and apparatus is used as the central technology in a consumer audio center wherein a consumer can randomly select a given number of songs selected from a music library and thereafter create his or her own customized audio tape in a matter of minutes. For example, ten 3-minute songs can be recorded in less than two minutes.

The present invention is a self-contained electronic storage and distribution system that will allow shoppers at department, discount and record stores, to select and sequence songs, for instantaneous reproduction on an audio cassette. A computer display terminal of the present invention displays a continually updated catalogue of songs from the full spectrum of music styles. The shopper can create a custom tape with, for example, selections from musicians ranging from Madonna to Mozart. At the push of a buttom, a shopper can produce in approximately two minutes, a high-quality, custom length cassette with up to about ten individual selections. In essence, the present invention allows the consumer to create a custom tape of favorite musical selections from a variety of albums available. The present invention therefore offers the consumer convenience, timeliness, simplicity and choice.

To perform these functions involves complex electronic components, and an inventive technology, which comprises storing audio information in compressed form on video laser discs, to reduce required storage space. After a video laser disc containing the audio signal is produced, the signal can be read from the laser disc, decompressed, converted to an analog audio signal, and then recorded on standard magnetic recording tape. To produce the video laser disc, an analog audio signal is produced from a phonograph record, magnetic tape, live performance, or so forth. This analog signal is converted to a digital signal through existing techinques. Then the digital signal is compressed by a time factor of about 200 to 300, with 225 being the preferred compression. This compressed signal is recorded on conventional magnetic video tape in standard NTSC format for storage, and for shipment to a commercial vendor who prepares video laser discs.

This video laser disc can be produced en masse economically, for use in a large number of entertainment centers according to the present invention, and the discs distributed thereto. A single video laser disc can hold about 40 to 80 hours of music, making it a very compact storage medium.

Hardware in the entertainment system according to the present invention allows the user to select songs, which are retrieved from the video laser disc, as a highly compressed audio signal, which is then decompressed from the original 200 to 300 times compression, to a speed of about 8 times normal playback speed. Then the signal is recorded onto a magnetic tape at 8 time normal playback speed, permitting a consumer to record, for example, a 30 minute tape in less than 2 minutes. This feature of compressing the recorded sound, storing it on video disc and then decompressing the sound and re-recording it onto an audio cassette tape is a primary novel feature of the present invention.

The present invention comprises a method of compressing an audio signal comprising:

a. supplying an analog audio signal;

b. filtering said analog audio signal to prevent aliasing;

c. converting said analog audio signal to a digital audio signal;

d. storing said digital audio signal on a signal storage means; and e. removing said digital audio signal from said mass storage means and converting said digital audio signal into a standard bandwidth video signal thereby converting the signal into a compressed audio signal.

The signal storage means can be a standard computer storage means such as a computer hard disk.

The method also comprises the further step of filtering the compressed audio signal to remove high frequency components which were introduced into the reconstructed analog signal during the digital to analog conversion process.

The method also comprises the further step of recording said compressed audio signal onto a videotape recorder to create a master video tape.

In addition, the method also comprises the further step of creating a video laser disc from said master video tape.

The present invention also comprises a method for creating an audio cassette tape from a video laser disc as defined above comprising the further steps of:

a. playing a particular frame from the video laser disc in still frame mode to create an analog video signal;

b. converting said analog video signal into a string of digital values;

c. sending the string of digital values through a buffer means to control the output data transfer rate of the digitzed compressed audio and to take up any gaps in the digital data stream caused during the frame grabbing process; and d. converting the digital audio stream into an analog audio signal.

The above method also includes the further step of controlling the data transfer rate during the time the digital signal is sent through the buffer means as set forth in element "c" above and during conversion of the digital signal into an analog audio signal and creating a time delay between the two steps to permit the data bits to stabilize prior to leaving the buffer means.

A further step in the above method is filtering the analog audio signal to remove high frequency components. Thereafter, the analog audio signal is recorded onto an audio tape at high speed.

It addition to the above described method, the present invention also includes the apparatus for creating the audio tape. The present invention comprises means for compressing an audio signal comprising:

a. means for supplying an analog audio signal;

b. means for filtering said analog audio signal to prevent aliasing;

c. means for converting said analog audio signal to a digital audio signal;

d. means for storing said digital audio signal on a mass signal storage means; and e. means for removing said digital audio signal from said mass signal storage means and converting said digital audio signal into a standard bandwidth video signal thereby converting the signal into a compressed audio signal.

The mass signal storage means can be a standard computer storage means such as a computer hard disk.

The present invention further comprises means for filtering the compressed audio signal to remove high frequency components which were introduced into the reconstructed analog signal during digital to analog conversion process.

The invention further comprises means for recording said compressed audio signal onto a videotape recorder to create a master video tape. Thereafter, a video laser disc is created from said master video tape by commercially available means.

The present invention also includes means for creating an audio cassette tape using the video laser disc which has been created as described above comprising:

a. means for playing a particular frame from the video laser disc in still frame mode to create an analog video signal;

b. means for converting said analog video signal into a string of digital values;

c. first in first out buffer means for controlling the output data transfer rate of the digitized compressed audio and for taking up any gaps in the digital data stream caused during the frame grabbing process; and d. means for converting the digital audio stream into an analog audio signal.

In addition, the apparatus further comprises output clock means for controlling the data transfer rate during the time the digital signal is sent through said first in first out buffer means as set forth in element "c" above and also through said means for converting the digital stream into an analog audio signal to thereby create a time delay between the two means to permit the data bits to stabilize prior to leaving the first in first out buffer means.

In addition, the apparatus further comprises means for filtering the analog audio signal to remove high frequency components. Thereafter, recording means are used to record the audio signal onto audio tape at high speed (such as 8 times normal).

The present invention further involves utilizing the above technology in an apparatus for producing an audio magnetic tape recording at high speed from a preselected music library comprising:

a. a user interface means to permit a user to select which songs the user wishes to record;

b. a compressed audio signal means which stores said music library in compressed analog video signal form; and c. an audio decompression high speed duplication means which can retrieve a selected number of songs from said music library, convert said analog video signal into a decompressed analog audio signal and record the decompressed analog audio signal at high speed onto an audio tape.

The user interface means further comprises:

a. a central processing unit means;

b. a video monitor means;

c. a video adapter means for interconnecting said video monitor means with said central processing unit means;

d. a keypad means; and e. a keypad interface means for interconnecting said keypad means to said central processing unit means.

It can further include:

a. printer means; and b. printer interface means for interconnecting said printer means with said central processing unit means.

As described above, the compressed audio signal means is a video laser disc onto which has been recorded a multiplicity of audio songs which have been converted from their original analog audio signal into a digital audio signal and thereafter converted into a standard bandwidth video signal and thereby compressed onto a video tape from which they are transferred onto the video disc.

The audio decompression high speed duplication means further comprises:

a. means for playing a particular frame from the video disc in still frame mode to create an analog video signal;

b. means for converting said analog video signal into a string of digital values;

c. first in first out buffer means for controlling the output data transfer rate of the digitized compressed audio and for taking up any gaps in the digital data stream caused during the frame grabbing process; and d. means for converting the digital stream into an analog audio signal.

The above further comprises output clock means for controlling the data transfer rate during the time the digital audio signal is sent through said first in first out buffer means and also through said means for converting the digital audio stream into an analog audio signal to thereby create a time delay between the two means to permit the data bits to stabilize prior to leaving the first in first out buffer means.

This apparatus further includes means for filtering the analog audio signal to remove high frequency components. The analog signal is thereafter recorded onto audio tape.

While the above audio decompression high speed duplication means has been described through a single set of equipment, it is emphasized that the consumer facility may contain a multiplicity of such means to facilitate simultaneous recording of more than one tape. Therefore, this portion of the present invention can also be described as an audio decompression high speed duplication means further comprises:

a. a multiplicity of means for playing a particular frame from the video disc in still frame mode to create an analog video signal;

b. a multiplicity of means for converting said analog video signal into a string of digital values wherein each such means is connected to a selected one of the multiplicity of means for playing a particular frame from the video disc;

c. a de-multiplexer circuit means for selecting a given one of said multiplicity of means for playing a particular frame from the video disc and for selecting a given song from said video disc;

d. a multiplicity of first in first out buffer means for controlling the output data transfer rate of the digitized compressed audio and for taking up any gaps in the digital data stream caused during the frame grabbing process wherein each such means is connected to a selected one of the multiplicity of means for converting said analog signal into a string of digital values; and e. a multiplicity of means for converting the digital stream into an analog audio signal wherein each such means is connected to a selected one of the multiplicity of first in first out buffer means.

The above multi-channel apparatus further can comprise output clock means for controlling the data transfer rate during the time the digital audio signal is sent through a given one of said first in first out buffer means and also through a given one of said means for converting the digital audio stream into an analog audio signal to thereby create a time delay between the two means to permit the data bits to stabilize prior to leaving the selected first in first out buffer means.

As with the single channel apparatus, the above apparatus further comprises a multiplicity of means for filtering the analog audio signal to remove high frequency components wherein each such means is connected to a selected one of the multiplicity of means for converting the digital audio stream into an analog audio signal.

As before, the apparatus further comprises means for recording said analog audio signal onto an audio cassette tape.

An object of the present invention is to provide an automatic, fully independent apparatus which produces customized audio cassette tapes according to the directions it receives from the input keyboard as selected by the consumer.

An additional object of the present invention is to provide a low cost method of enabling consumers to obtain any combination of selected musical works on one cassette at a minimum of expense.

Another object of the present invention is to present an audio-visual display of the recordings in its library.

A further object of the present invention is to provide a means for storing an audio signal in a highly compressed form from which it can be retrieved and decompressed and thereafter recorded onto a cassette tape at a very high speed (for example 8 times normal) in order to quickly and efficiently produce a cassette tape of 30 to 60 minutes playing time while the consumer waits.

Further novel features and other objects of the present invention will become apparent from the following detailed description, discussion and the appended claims taken in conjunction with the drawings.

DRAWING SUMMARY

Referring to the drawings for the purpose of illustration only and not limitation, there is illustrated:

DETAILED DESCRIPTION OF THE PREFERRED EMBODIMENT

Figure 1:
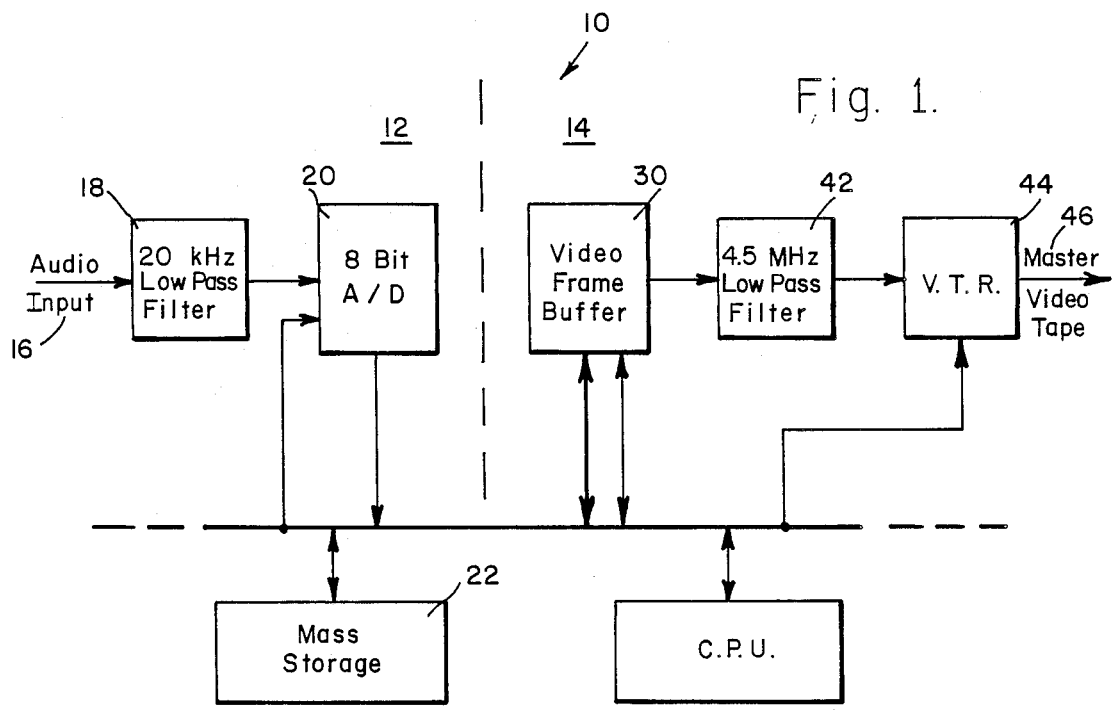
FIG. 1 is a block diagram of the audio compression and premastering circuit of the present invention.

Although the apparatus and method of the present invention will now be described with reference to specific embodiments in the drawings, it should be understood that such embodiments are by way of example and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Prior to discussing the block diagrams of the invention in detail, it will be useful to provide the theroretical basis of principles on which the present invention is based.

A key feature of the present invention is Analog Audio Time-base Compression ("AATC"). The heart of the AATC system is based on the interaction of three ideas:

1. Analog to digital/digital to analog conversion.
2. Video disc storage based on the composite RS-170A monochrome television/video signal format.
3. Temporary storage and time-base manipulation of digitized audio information.

The standard broadcast signal of the television/video industry is the high frequency modulation of a baseband RS-170A, NTSC color, video signal. This baseband format is defined within the "frame", which is composed on 525 horizontal scanning lines of video information. These lines are composed of video information (DC to 4.5 MHz modulated with a phase-variable 3.58 MHz subcarrier), horizontal Sync and blanking pulses, vertical Sync and blanking pulses, and a color burst circuit reference signal at 3.58 MHz.

Color information is encoded within the phase of the subcarrier which is compared to the reference burst and decoded. Monochrome operation simply strips the carrier and burst away leaving a composite RS-170A Gray Scale signal. This type of signal was the original industry standard before the introduction of color, whereupon NTSC color was designed to fit within the RS-170 format. This design is configured around the monochrome format.

The total time for one sweep of a horizontal line is 63.5 microseconds. The usable time for video information within this one line is approximately 52.5 microseconds. This interval is the slot in which the compressed audio is stored within the frame, 482 lines are available for video information. The remaining 43 horizontal lines contain vertical synchronization and blanking level. Thus, each frame contains approximately 25.3 milliseconds of real time, 4.5 MHz bandwidth, analog storage area.

Digitization of analog signals is governed by the Nyquist Sampling Theory. This theory states that to faithfully reproduce a signal after converting it from analog to digital form and back again, the original signal must be sampled at least twice as fast as its highest frequency component. For example, if a signal had a bandwidth of 4.5 MHz, it would have to be sampled at a rate of 9.0 MHz or greater in order to accurately retain the original information.

Normal audio has a bandwidth of 20 kHz which dictates a minimum sampling frequency of 40 kHz. Given a sampling rate of 40 kHz, the number of digital samples collected in 52.5 microseconds (the normal information time slot in a horizontal (H) line) is 2.1 samples. Similarly, if a 4.5 MHz bandwidth video signal is samples at 9.0 MHz, the number of samples collected in 52.5 microsencods is 472.5. The ratio of video samples to audio samples is 225/1. This ratio illustrates the time compression an audio signal would have to experience to appear similar to a video signal. Faster sampling of the audio signal reduces the compression ratio while a slower sampling rate increases the ratio.

Thus, an audio signal with a bandwidth of 20 kHz can be sampled at 40 kHz, stored temporarily, and reconverted to an analog signal at the rate of 9.0 MHz. The process time compresses the original audio information by 225 times. This compressed audio signal, which has a bandwidth of 4.5 MHz, can then be transferred onto a video laser disc that has the capacity to store composite video signals with a bandwidth of 4.5 MHz.

A video disc has 54,000 frames, with each frame containing 482 usable horizontal lines for compressed audio information. Each of these horizontal lines can store 11.81 milliseconds of compressed audio in a 52.5 microsecond slot. The total amount of 20 kHz bandwidth audio that can be stored on a video disc is 85.4 hours (11.81E-3 sec./line X 482 lines/frame X 54,000 frames/disc). Given the average song length as 3 minutes, the maximum number of full fidelity monophonic songs stored is 1708. Stereophonic music would halve this capacity since two channels have to be stored on the video disc rather than just one.

In general, the capacity of the video disc is directly affected by the difference between the real time audio bandwidth and the compressed audio bandwidth. The maximum compressed audio bandwidth is 4.5 MHz, this being dictated by the present bandwidth limits in video disc technology. It can be reduced by lowering the D/A reconstruction rate from 9.0 MHz with the result of lowering the compression factor. The original audio signal is not degraded assuming that it was initially sampled at 40 kHz or greater. The bandwidth of the real-time audio passband can be arbitrarily set with lowpass filtering with the result of degrading the fidelity of the original signal as the limit is lowered. This action increases the compression factor if the compressed audio bandwidth is held constant, since the Nyquist sampling rate could in turn be reduced as indicated by the Nyquist theory.

Audio compression is accomplished by digitizing the selected songs and temporarily storing them in a digital memory device. This digital information is then converted back to an analog signal at two times the selected compressed audio rate, and combined with a RS-170A signal. The resulting composite signal is then used for video disc PREMASTERING and MASTERING Audio signal retrieval is the reverse process of compression. The compressed audio is read from the video disc in the original segments and then re-processed at a slower rate that matches the recording speed of an audio cassette tape duplicator. The original audio is captured on an audio cassette for normal playback.

The system of the present invention can be divided up into three main areas as follows:

A. Audio Compression and Pre-Mastering.
B. Video Laser Disc Mastering.
C. The Consumer Entertainment Center System.

I. Audio Compression And Premastering

The audio compression and premastering stage involves passing the audio information through electronic compression circuits in order to create the proper signal for recording on videotape. The final videotape will be used as the source of information by the video disc fabrication facilities.

The audio compression and premastering circuits block diagram 10 is shown in FIG. 1. The diagram is divided by a vertical line into two parts. The left hand side is the audio digitization system 12, and the right hand side is the audio compression system 14. Each of these sections are discussed below.

A. Audio Digitization System

The audio digitization system 12, shown in the left hand side of FIG. 1 is used to encode and store the analog audio in a digital form. The blocks that make up the audio digitization system are described below:

(i) Audio Input

The audio input 16 is a standard analog audio signal. The signal comes from a master tape produced by an audio recording studio. The tape contains recordings of the songs that make up the system library. The audio input is a 20 Hz to 20 kHz signal.

(ii) 20 kHz Low Pass Filter (18)

This filter 18 is needed to prevent "aliasing" (distortion due to the sampling process) of the audio input signal. The filter prevents "aliasing" by attenuating any signal components greater than 20 kHz. Specifically, to completely eliminate "aliasing", any signal component whose frequency is greater than ½ the sampling frequency, must be attenuated below the voltage level that the analog to digital (A/D) converter can discern. Given the 8-bit A/D converter used in this system, the signal components must be attentuated by 54 dB.

(iii) 8 Bit Analog To Digital Converter (20)

This component 20 converts tha analog signal into a digital form. The resolution of the converter is 8 bits, which means that the input analog voltage can be given one of 256 different values each time that a sample is taken. The operation of the A/D is controlled by the CPU (Central Processing Unit). The CPU tells the A/D system when to start and stop sampling, and how fast to sample. The A/D converter is part of a commercially available analog input/output system.

(iv) Mass Storage Device (22)

The mass storage device 22 is used to store complete digitized songs until it is time to compress the signal with the video frame buffer. The mass storage device is a commercially available hard disk drive of 292 MB capacity. Proprietary software is used to transfer the digitized audio samples from the A/D converter to the hard disk.

B. Audio Compression System

The audio compression system 14, shown in the right and side of FIG. 1, takes the digitized audio information, and converts it into a standard video signal. The blocks that make up the audio compression system are discussed below.

(i) Video Frame Buffer (30)

Figure 2:
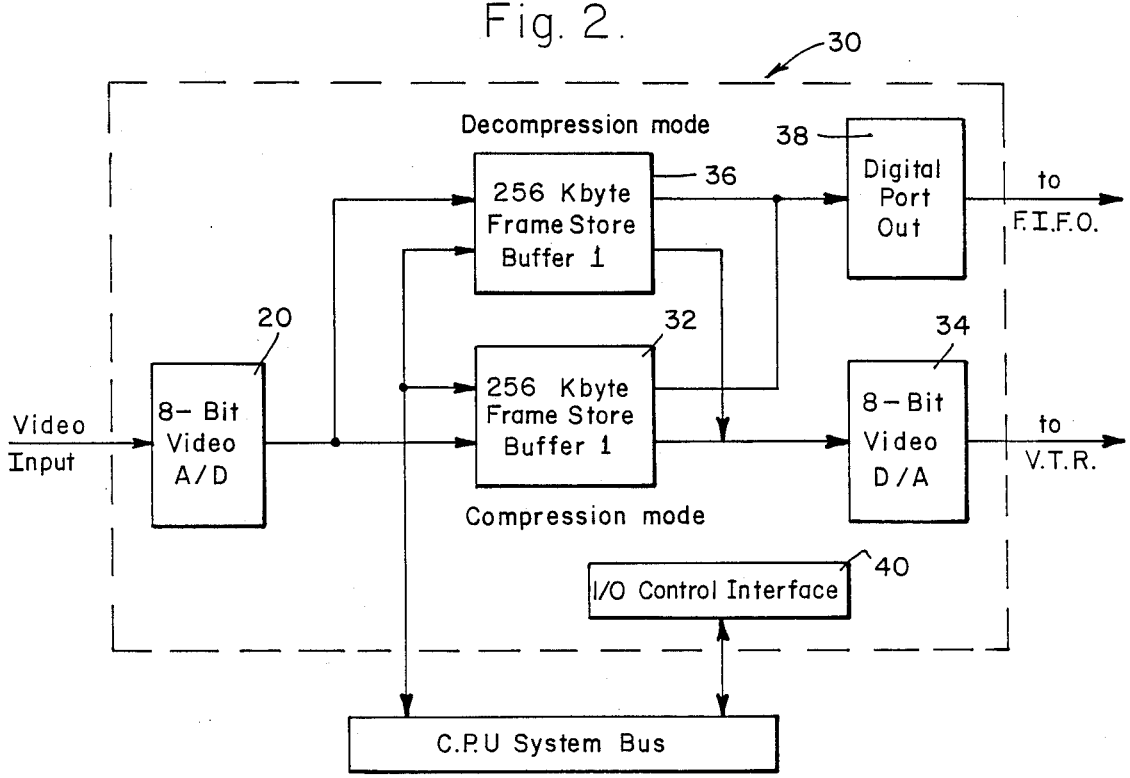
FIG. 2 is a block diagram of the video frame buffer, showing both the compression and decompression circuits.

The video frame buffer 30 is the heart of the audio compression and decompression processes. The frame buffer can take a video image, and convert it into a digital representation of the image, or it can perform the reverse process. The video frame buffer is shown in greater detail in FIG. 2, and will now be discussed in detail:

(a) Referring to FIG. 2, in the audio compression mode, the sequence of events is as follows. One frame of of the digitized audio signal is transferred from the mass storage device (see FIG. 1) to one of the 256 Kbyte buffers 32.

(b) Next, the frame buffer outputs the digital values sequentially to the 8-bit D/A converter 34. The D/A converts the digital audio numbers into a standard bandwidth video signal. This standard video signal is the compressed audio signal which is used in the major hardware duplication center as its audio signal.

This process of creating one frame of compressed audio is repeated as many times as is necessary to make a whole song.

(ii) 4.5 MHz Low Pass Filter (42)

Referring once again to FIG. 1, this filter 42 is used to remove high frequency components that are introduced into the reconstructed analog signal during D/A operations. The analog signal appears as a staircase approximation after the D/A conversion process. The filter smoothes out the staircase, and attenuates all frequency components greater than 4.5 MHz.

(iii) Videotape Recorder (44)

The videotape recorder (VTR) 44 is used to record the master videotape that is used to make the video disc. The VTR records the compressed audio signal that is put out by the Video Frame Buffer.

(iv) Master Video Tape (46)

The master video tape 46 is used by the video disc manufacturers to make the video disc. The content of the video tape is the complete audio library in compressed audio form.

II. VIDEO LASER DISC MASTERING

Mastering is the process of producing a video laser disc from a customer supplied master videotape. The process entails a contractual agreement with a video production facility (e.g. 3-M Optical Recording Division). Certain requirements must be met when putting the audio information on the videotape. An example of these requirements is given in the PREMASTERING-/POSTPRODUCTION PROCEDURES FOR SCOTCH VIDEODISCS, available from 3-M Optical Recording Division. Other production companies have their own guidelines, but in general, they all follow the RS-170A NTSC standards that are used in the television industry today.

The RS-170A NTSC standard specifies the overall video signal architecture by standardizing a synchronization waveform and regulating the information signal bandwidht. It also defines the phase-to color relationships and subcarrier specifications. Upon special request, a video disc can be produced which will omit all NTSC specifications, leaving a RS-170A Gray Scale formatted video disc. This is the format used in conjunction with the present invention.

III. THE CENTRAL CONSUMER TAPE DUPLICATING SYSTEM

Figure 3:
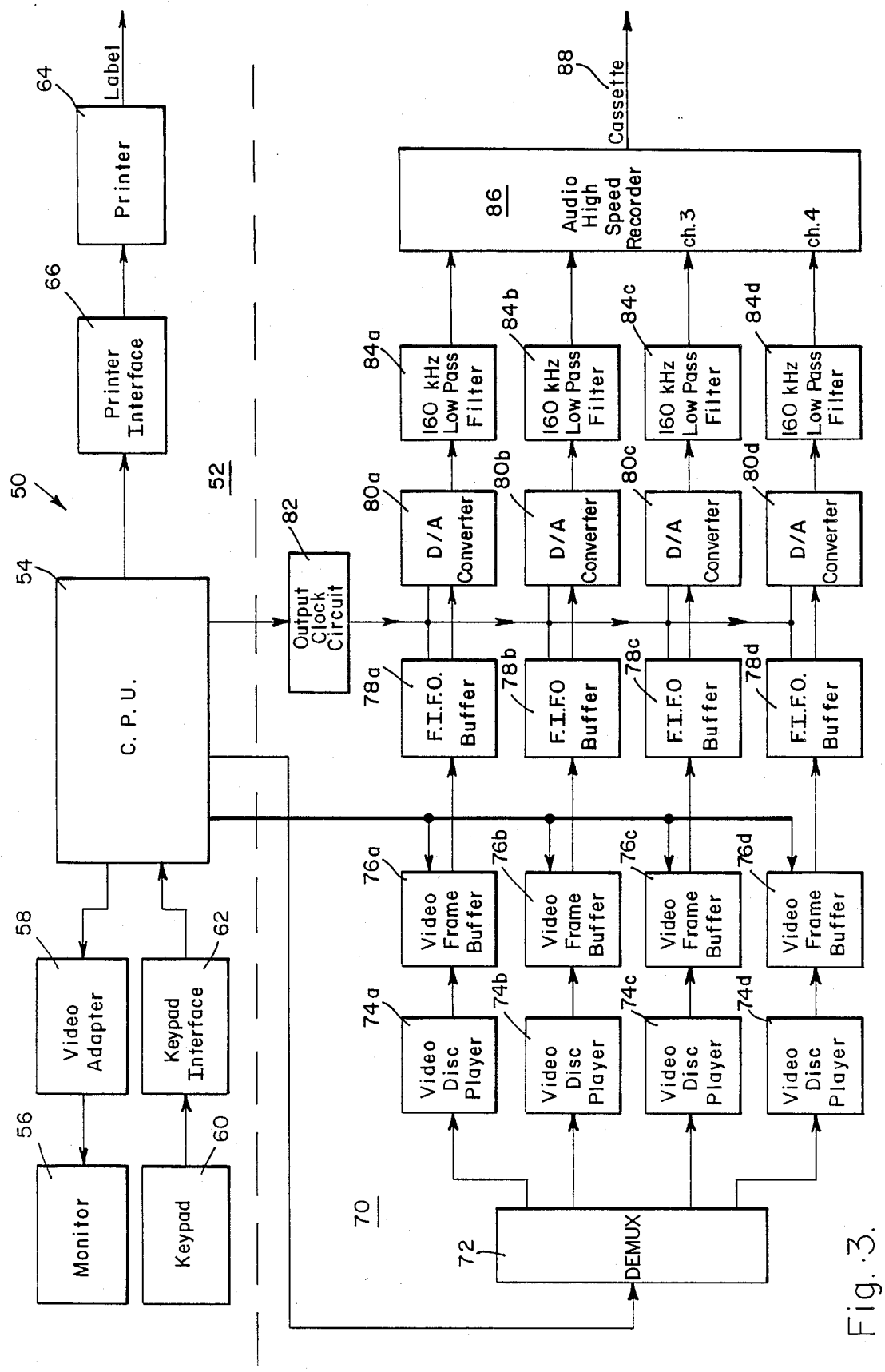
FIG. 3 is a block diagram of the central consumer tape duplicating apparatus of the present invention.

The Central Consumer Tape Duplicating System 50 contains all the systems that are required to allow the user to produce his/her own customized audio cassette tape. As shown in FIG. 3, the Overall System can be broken up into two subsystems, the User Interface System 52 and the Audio Decompression/High Speed Duplication System 70. The two subsystems are discussed below.

A. The User Interface System (52)

The User Interface System 52 is the only piece of the AATC system that the consumer will ever need to see. The interface allows the user to choose which songs he wants recorded on the audio cassette tape, provides a printed record of his selections, and adhesive labels to place on the cassette. The individual components that make up the user interface system are discussed below.

(i) Central Processing Unit (54)

The Central Processing Unit (CPU) 54 is the overall governing controller of the Consumer Duplication System. The CPU is an important feature of both the user interface and audio decompression/high speed duplication systems. The CPU is a standard microprocessor based microcomputer such as an IBM-PC or IBM-AT. The way in which the CPU controls all the other subgroups will be discussed in conjunction with the specific subgroup.

(ii) Monitor and Video Adapter

The monitor 56 and video adapter 58 provides a video interface to the user. The monitor displays the song library, the menu, and shows the user which songs he/she has selected. The video display is a standard RGB color monitor, and the adapter is a Color Graphics Adapter.

(iii) Keypad and Keypad Interface

The keypad 60 and keypad interface 62 provide the feedback loop that allows the user to control the CPU. The keypad system is used to choose menu functions, scroll up and down through the song library, and save and delete songs. All the user's keypad inputs are reflected by a change in the video display shown on the monitor. They keypad used is a matrix output membrane switch assembly. The keypad interface is a standard, off the shelf keyboard encoder. The keyboard encoder converts a switch closure into an ASCII character code that represents that switch. The CPU interprets the ASCII code, and executes the command it represents.

(iv) Printer and Printer Interface

The printer 64 and printer interface 66 provide printed output for the user. Three types of output are printed. The first is a listing of the songs that the user has selected, printed on plain paper. The second is a listing of the songs selected that is folded to fit into the cassette tape box. The last form is a song listing that is printed on an adhesive label that is placed on the cassette shell itself. The printer used can be a standard laser jet and the interface can be a parallel printer port.

B. Audio Decompression/High Speed Duplication System (70)

This system 70 performs all the analog and digital signal processing tasks necessary to retrieve the songs from the video disc, and place them on the user's audio cassette tape. This system is shown below the dotted lines on FIG. 3. A look at the block diagram reveals that the system is made up of four channels of identical equipment. Given this fact, only one of the four channels is discussed below.

(i) De-Multiplexer (DEMUX) Circuit (72)

The DEMUX 72 is used to control the four video disc players. Two types of information are sent from the CPU to the DEMUX. The first type, the channel selection signal, tells the DEMUX which disc player to send the RS-232 command to. The channel selection information is sent as a two bit word from the CPU's parallel port. The second type of signal, the RS-232 data, tells the selected video disc player to play a particular frame in still-frame mode. The frame number signal is sent out from the CPU by its serial port, and is taken in by the RS-232 control port of the video disc player.

(ii) Video Disc Player (74a–d)

The video disc player 74a–d simply plays the video disc that contains the compressed audio signal. The disc player operates in still-frame mode, which outputs one frame over and over again. The compressed audio signal is an RS-170 format video signal.

(iii) Video Frame Buffer (76a–d)

The video frame buffer 76a–d is used to convert the analog video signal into a string of digital values, and output the string to the First In First Out (FIFO) Buffer. The internal structure of the video frame buffer is shown in FIG. 2. When operating in the audio decompression mode, the compressed audio is the video input to the 8- bit video A/D converter 20. On a command from the CPU, the frame "grab" begins. The analog video signal is converted into a sequence of digital values. The digital values are stored sequentially in the 256 kbyte buffer 36. On a second command from the CPU, the frame buffer sends the digital values out its digital port 38. In both the frame grab and the digital output processes, a control bit in the frame buffer's Input Output (I/O) Control Interface 40 tells the CPU when the process is complete. The digital port is a high speed, 8-bit parallel port.

(iv) First In First Out (FIFO) Buffer (78a–d)

The FIFO Buffer 78a–d has two primary purposes; to control the output data transfer rate of the digitized compressed audio, and to take up any gaps in the digital dat stream caused during the frame grabbing process. The FIFO's behavior is aptly described by its name. The buffer is digital memory that can be simultaneously filled through its input port and emptied through its output port. The first byte that enters the input end is the first byte to leave the output end. The rate at which the FIFO is clocked is the data transfer rate out to the D/A converter. While the frame buffer is outputting from its digital port at 2.5 Mbyte/sec, the output rate from the FIFO is only 320 Kbyte/sec. As soon as the FIFO is filled to its capacity, it begins a sequence of "handshakes" with the frame buffers's output port. The FIFO tells the frame buffer's port that it is full, and this stops any further output from the digital port. As soon as one byte leaves the FIFO, it allows the digital port to send one more byte into the FIFO. In this manner, the FIFO is maintained in a full state. Whit the FIFO is a full state, the system has a period of time available in which data can continue flowing out of the FIFO, with no data flowing in. It is this "buffer" time that allows the frame buffer to go back and grab the next frame of the song from the video disc, while maintaining a constant data output from the FIFO.

(v) Digital To Analog Converter (80a–d)

The D/A Converter 80a–d changes the digital audio data stream coming out of the FIFO back into an analog waveform. The converter is a complete, very high speed (up to 20 MHz), 8-bit, deglitched D/A module. The deglitching circuits contained within the module are used to control the glitches (high frequency voltage spikes) created by the D/A Converter during the transition from one digital value to the next.

(vi) Output Clock Circuit (82)

The output clock circuit (OCC) 82 has two primary functions. The first is to control the data transfer rate through the FIFO and D/A circuits, and the second is to create the timing delay between the clocking of the FIFO and the D/A. Put in other words, the OCC provides the same clocking frequency to both the FIFO and the D/A, but delays the clock pulse sent to the D/A relative to the pulse sent to the FIFO. The delay allows the data bits to stabilize on the ouput port of the FIFO before they are clocked into the D/A. If the delay were not included, the digital value appearing on the input of the D/A would be changing while the D/A was trying to convert the value into an analog voltage.

The operation of the OCC is controlled by the CPU. The CPU sends control signals to the OCC that tell it when to start and stop clocking. The clocking rate provides the 8 times normal speed output required by the high speed cassette recorder.

(vii) 160 kHz Low Pass Filter (84a–d)

This filter is used to remove high frequency components that are introduced into the reconstructed analog signal during D/A operations. The analog signal appears as a staircase aproximation after the D/A conversion process. The filter smoothes out the staircase and attenuates all frequency components greater the 160 kHz.

(viii) Audio High Speed Cassette Recorder (86)

The high speed cassette recorder 86 is used to record the high speed analog audio signal onto a standard audio cassette tape 88. The cassette recorder moves the tape past the head at 8 times normal speeds. Thus, when the audio signal comes in at 8 times normal frequencies, a real time audio recording is accomplished. The recorder records onto the cassette tape while it is in its shell. All four tracks of the tape (right and left channels of sides 1 and 2) are recorded simultaneously. The CPU sends control signals to start, stop, and rewind the tape.

Of course the present invention is not intended to be restricted to any particular form or arrangement, or in any specific embodiment disclosed herein, or any specific use, since the same may be modified in various particulars or relations without departing from the spirit or scope of the claimed invention hereinabove shown and described, of which the apparatus shown is intended only for illustration and for disclosure of an operative embodiment and not to show all of the various forms and modifications in which the invention might be embodied.

The invention has been described in considerable detail in order to comply with the patent laws by providing a full public disclosure of at least one of its forms. However, such detailed description is not intended in any way to limit the broad features or principles of the invention, or the scope of the patent monopoly to be granted.

What is claimed is:

1. A method for producing a custom audio tape consisting of selections from a prerecorded selection library comprising:
    a. creating a selection library from a multiplicity of selections from a multiplicity of master audio tapes in which the audio is recorded in analog signal form by:
        (i) supplying each analog audio signal from its respective audio tape wherein the audio input is a signal in the range of 20 Hz to 20 kHz;
        (ii) filtering said analog audio signal through a 20 kHz low pass filter to prevent aliasing;
        (iii) converting said analog audio signal to a digital audio signal by passing the filtered analog audio signal through an 8 Bit analog to digital converter;
        (iv) storing the digital audio signal on a signal storage means;
        (v) removing said digital audio signal from said signal storage means and converting said digital audio signal into a standard bandwidth video signal by passing the digital audio signal through a 256 Kbyte video frame buffer and thereafter outputting the signal from the video frame buffer sequentially through an 8 bit digital to analog converter thereby converting the signal into a standard bandwidth video signal which is a compressed audio signal;
        (vi) passing the compressed audio signal through a 4.5 MHz low pass filter to remove high frequency components;
        (vii) recording the compressed filter audio signal on a videotape recorder;
        (viii) repeating steps a. (i) through a. (vii) for each signal from each selection chosen from the multiplicity of master audio tapes;
        (ix) mastering the video tapes containing the compressed filtered audio signals onto a video laser disc to create an RS-170A Gray Scale formatted video laser disc wherein each analog audio signal is an RS-170 format video signal, comprising all of the desired selections;
    b. selecting a specified subset of audio recordings from the selections on said video laser disc;
    c. creating said specified subset of audio recordings from the selections on said video laser disc by:
        (i) playing a particular frame from the video laser disc in still frame mode to create an analog video signal;
        (ii) passing the analog video signal frame by frame through a video frame buffer to convert said analog video signal into a string of digital values and storing the digital values in a 256 kbyte frame storage buffer and thereafter sending the digital values out its digital port;
        (iii) sending the string of digital values through a first in first out buffer to control the output data transfer rate of the digitized compressed audio and to take up any gaps in the digital data stream caused during the frame grabbing process;
        (iv) converting the digital audio stream into an analog audio signal by passing the digital audio signals through and 8 bit digital to analog converter;
        (v) controlling the data transfer rate during the time a digital signal is sent through the first in first out buffer and during conversion of the digital signal into an analog audio signal and creating a time delay between the two steps to permit the data bits to stabilize prior to leaving the first in first out buffer;
        (vi) filtering the analog audio signal through a 160 kHz low pass filter to remove high frequency components;
        (vii) recording the analog audio signal onto an audio tape; and
        (viii) repeating steps c. (i) through c. (vii) for each signal from each of the desired selections on the specified subset of audio recordings from the selections on said video laser disc.

2. The method in accordance with claim 1 wherein said signal storage means is a computer hard disk.

3. The method in accordance with claim 1 wherein said first in first out buffer receives information at approximately 2.5 Mbyte per second and outputs information at approximately 320 kbyte per second.

4. The method in accordance with claim 1 wherein the recording of the analog audio onto audio tape is performed at approximately 8 times normal speed.

5. The method in accordance with claim 1 wherein selecting a specified subset of audio recordings from the selections on said video laser disc further comprises inputting commands through a user interface means to a central processing unit which controls the processes specified in c. (i) through c. (vii).

6. A method for producing a custom audio tape consisting of selections from a prerecorded selection library comprising:
    a. creating a selection library from a multiplicity of selections from a multiplicity of master audio tapes in which the audio is recorded in analog signal form by:
        (i) supplying each analog audio signal from its respective audio tape;

(ii) filtering said analog audio signal through a low pass filter to prevent aliasing;

(iii) converting said analog audio signal to a digital audio signal by passing the filtered analog audio signal through an analog to digital converter;

(iv) storing the digital audio signal on a signal storage means;

(v) removing said digital audio signal from said signal storage means and converting said digital audio signal into a standard bandwidth video signal by passing the digital audio signal through a video frame buffer and thereafter outputting the signal from the video frame buffer sequentially through a digital to analog converter thereby converting the signal into a standard bandwidth video signal which is a compressed audio signal;

(vi) passing the compressed audio signal through a low pass filter to remove high frequency components;

(vii) recording the compressed filtered audio signal on a videotape recorder;

(viii) repeating steps a. (i) through a. (vii) for each signal from each selection chosen from the multiplicity of master audio tapes;

(ix) mastering the video tapes containing the compressed filtered audio signals onto a video laser disc to create an RS-170A Gray Scale formatted video laser disc wherein each analog audio signal is an RS-170 format video signal, comprising all of the desired selections;

b. selecting a specified subset of audio recordings from the selections on said video laser disc;

c. creating a specified subset of audio recordings from the selections on said video laser disc by:

(i) playing a particular frame from the video laser disc in still frame mode to create an analog video signal;

(ii) passing the analog video signal frame by frame through a video frame buffer to convert said analog video signal into a string of digital values and storing the digital values in frame storage buffer and thereafter sending the digital values out its digital port;

(iii) sending the string of digital values through a first in first out buffer to control the output data transfer rate of the digitized compressed audio and to take up any gaps in the digital data stream caused during the frame grabbing process;

(iv) converting the digital audio stream into an analog audio signal by passing the digital audio signals through a digital to analog converter;

(v) controlling the data transfer rate during the time a digital signal is sent through the first in first out buffer and during conversion of the digital signal into an analog audio signal and creating a time delay between the two steps to permit the data bits to stabilize prior to leaving the first in first out buffer;

(vi) filtering the analog audio signal through a low pass filter to remove high frequency components;

(vii) recording the analog audio signal onto an audio tape; and (viii) repeating steps c. (i) through c. (vii) for each signal from each of the desired selections on the specified subset of audio recordings from the selections on said video laser disc.

7. The method in accordance with claim 6 wherein said signal storage means is a computer hard disk.

8. The method in accordance with claim 6 wherein said first in first out buffer receives information at approximately 2.5 Mbyte per second and outputs information at approximately 320 kbyte per second.

9. The method in accordance with claim 6 wherein the recording of the analog audio signal onto audio tape is performed at approximately 8 times normal speed.

10. The method as defined in claim 6 wherein said analog audio signal from the master audio tape is in a range from 20 Hz to 20 kHz.

11. The method as defined in claim 6 wherein said filtering of the analog audio signal to prevent aliasing is performed through a 20 kHz low pass filter.

12. The method as defined in claim 6 wherein the conversion of said analog audio signal to a digital audio signal in step a. (iii) is performed through an 8 Bit analog to digital converter.

13. The method as defined in claim 6 wherein the signal storage means used is a computer hard disk.

14. The method as defined in claim 6 wherein the digital audio signal is converted into a compressed audio signal by passage through a video frame buffer and then through and 8-bit digital to analog converter.

15. The method as defined in claim 6 wherein the filtering of the compressed audio signal in step a. (vi) is performed through a 4.5 MHz low pass filter.

16. The method as defined in claim 6 wherein the converting of the digital audio signal into an analog audio signal in step c. (iv) is performed through an 8-bit deglitched digital to analog module.

17. The method as defined in claim 6 wherein the step of filtering the analog audio signal to remove high frequency components in step c. (vi) is performed through a 160 kHz low pass filter.

18. An apparatus for producing an audio magnetic tape recording at high speed consisting of selections from a preselected selection library comprising:

a. user interface means to permit a user to select which selections the user wishes to record, further comprising:

(i) a central processing unit means;

(ii) a video monitor means;

(iii) a video adapter means for interconnecting said video monitor means with said central processing unit means;

(iv) a keypad means;

(v) a keypad interface means for interconnecting said keypad means to said central processing unit means;

(vi) printer means;

(vii) printer interface means for interconnecting said printer means with said central processing unit means;

b. a prerecorded selection library comprised of a multiplicity of selections comprising audio signals from master audio tapes which signals have been filterd through a low pass filter to prevent aliasing, converted into a digital audio signal by having been passed through an analog to digital converter and thereafter converted into a standard bandwidth video signal by being passed through a video frame buffer and digital to analog converter to thereby be converter into a standard bandwidth video signal which is a compressed audio signal, subsequently passed through a low pass filter to remove high frequency components, recorded onto a videotape recorder and subsequently mastered onto a video laser disc such that the prerecorded selection library is comprised of compressed audio signals formatted as video signals on a video laser disc;

c. at least one video disc player for playing a particular frame from the video laser disc in still frame mode to create an analog video signal;

d. at least one video frame buffer for converting the analog signal from the at least one video disc player into a string of digital values;

e. at least one first in first out buffer for controlling the input data transfer rate of the digitzed compressed audio and for taking up any gaps in the digital data stream caused during the frame grabbing process;

f. at least one digital to analog converter for converting the digital audio stream into an analog audio signal;

g. an output clock circuit for controlling the data transfer rate during the time the digital audio signal is sent through said first in first out buffer and also through the digital to analog converter to thereby create a time delay between the first in first out buffer and the digital to analog coverter to permit the data bits to stabilize prior to leaving the first in first out buffer;

h. at least one low pass filter for filtering the signal which has been converted into the analog audio signal;

i. an audio tape; and j. an audio tape recorder for recording the filtered analog audio signal into the audio tape.

19. An apparatus for producing an audio magnetic tape recording at high speed consisting of selections from a preselected selection library comprising:

a. a user interface means to permit a user to select which selections the user wishes to record, further comprising:
  (i) a central processing unit means;
  (ii) a video monitor means;
  (iii) a video adapter means for interconnecting said video monitor means with said central processing unit means;
  (iv) a keypad means;
  (v) a keypad interface means for interconnecting said keypad means to said central processing unit means;
  (vi) printer means;
  (vii) printer interface means for interconnecting said printer means with said central processing unit means;

b. a prerecorded selection library comprised of a multiplicity of selections comprising audio signals from master audio tapes which signals have been filtered through a low pass filter to prevent aliasing, converted into a digital audio signal by having been passed through an analog to digital converter and thereafter converted into a standard bandwidth video signal by being passed through a video frame buffer and digital to analog converter to thereby be converter into a standard bandwidth video signal which is a compressed audio signal, subsequently passed through a low pass filter to remove high frequency components, recorded onto a videotape recorder and subsequently mastered onto a video laser disc such that the prerecorded selection library is comprised of compressed audio signals formatted as video signals on a video laser disc;

c. a multiplicity of video disc players for simultaneously playing selected particular frames from the video laser disc in still frame mode to create an analog video signal from each frame played;

d. a multiplicity of video frame buffers wherein a respective video frame buffer is connected to a respective video disc player for converting the analog signal from the video disc player to which it is connected into a string of digital values;

e. a de-multiplexer circuit for selecting a given one of said multiplicity of video disk players for playing a particular frame from the video laser disc;

f. a multiplicity of first in first out buffers wherein a respective first in first out frame buffer is connected to a respective video frame buffer for controlling the input data transfer rate of the digitzed compressed audio and for taking up any gaps in the digital dat stream caused during the frame grabbing process;

g. a multiplicity of analog to digital converters wherein a respective digital to analog converter is connected to a first in first out buffer for converting the digital audio stream from the first in first out buffer into an analog audio signal;

h. an output clock circuit connected to said multiplicity of video frame buffers for controlling the data transfer rate during the time the digital audio signal is sent through each first in first out buffer and also through each digital to analog converter to thereby create a time delay between each first in first out video frame buffer and the respective digital to analog converter to which it is connected to permit the data bits to stabilize prior to leaving each first in first out video frame buffer;

i. a multiplicity of low pass filters wherein a respective low pass filter is connected to a digital to analog converter for filtering the signal from the respective digital to analog converter which has been converted into the analog audio signal;

j. an audio tape; and k. an audio tape recorder for recording each filtered analog audio signal onto the audio tape.

* * * * *